Aug. 8, 1950 W. V. CORNETT 2,517,980
BREAKER ATTACHMENT FOR SHOVELS
Filed Nov. 2, 1946 2 Sheets-Sheet 2
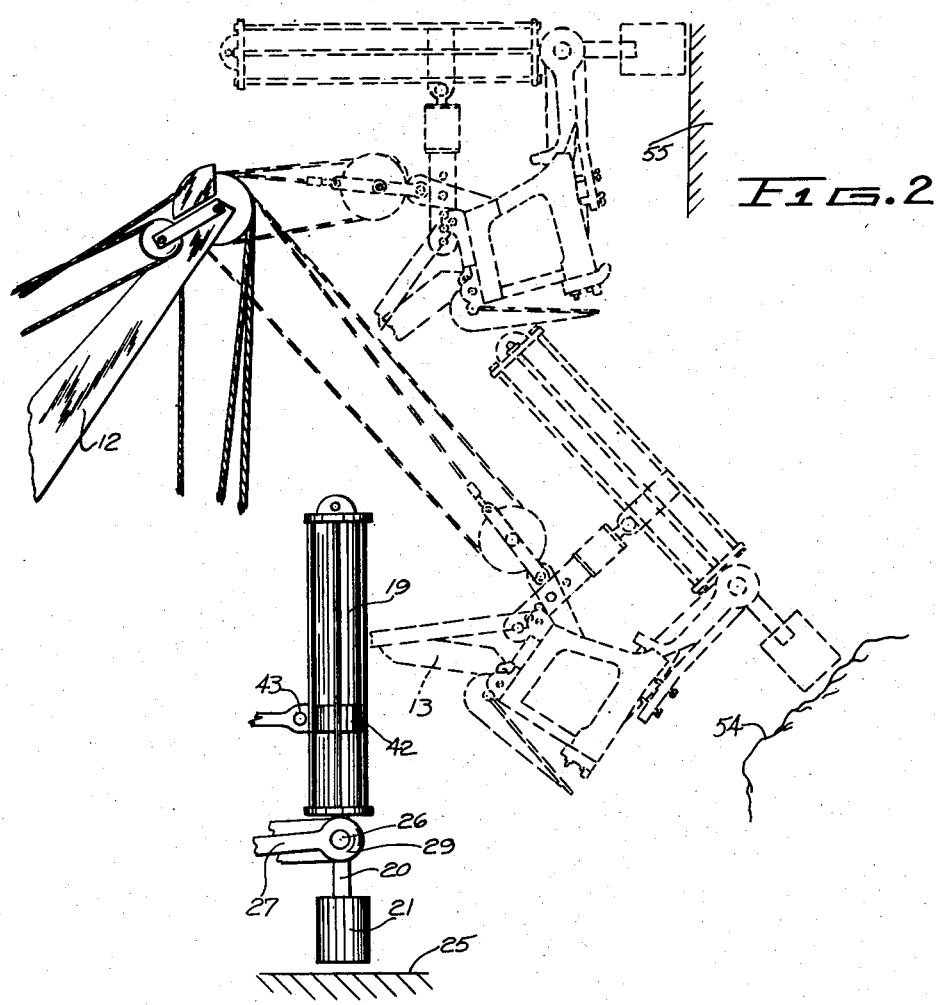
Fig. 2
Fig. 3
Fig. 4
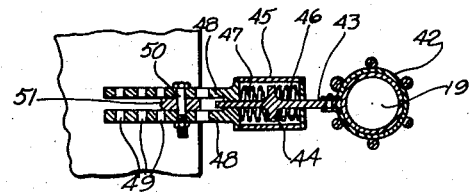
INVENTOR.
WALTER V. CORNETT
BY
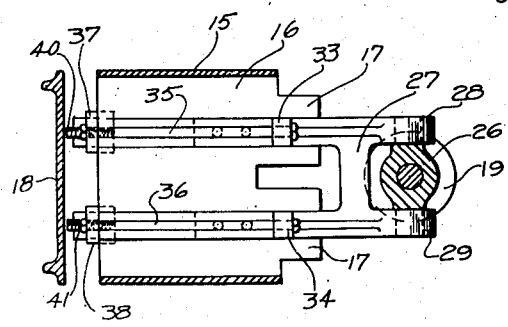
ATTORNEYS Patented Aug. 8, 1950

2,517,980

UNITED STATES PATENT OFFICE 2,517,980

BREAKER ATTACHMENT FOR SHOVELS

Walter V. Cornett, Los Angeles, Calif.

Application November 2, 1946, Serial No. 707,443

2 Claims. (Cl. 262—13)

This invention relates to the combination with a power shovel rig of an impact tool where the tool may be swung to various positions inclined to the vertical, so that the tool may break vertical walls and the like as well as horizontal pavements or other work.

An object of the invention is to attach a suitable impact tool to the bucket of a power shovel without changes in the shovel so that the impact tool can be moved horizontally and vertically, utilizing the means ordinarily employed for moving the bucket of the shovel.

Another object is to provide means for clamping an impact tool to the bucket of a power shovel that will insure the tool moving to predetermined positions as the bucket is moved.

A further object is to combine an impact tool with a power shovel in such a manner that the tool may be operated by the operator of the power shovel and from the cab thereof.

Further objects and advantages of the invention will be apparent from the following specification taken in connection with the accompanying drawings, in which, by way of illustration, a preferred embodiment of the device is disclosed. It will be understood, however, that many changes and modifications can be made in the details of construction, the invention being as defined in the appended claims.

In the accompanying drawings:

Figure 2 is a diagram showing how, the bucket of the shovel is moved, the impact tool is inclined at various angles to the vertical, and may, when fully elevated, be used with its cylinder horizontal;

Figure 3 is a sectional view on the line 3, 3 of Figure 1; and

Figure 4 is a view partially in section on the line 4, 4 of Figure 1.

Figure 1:
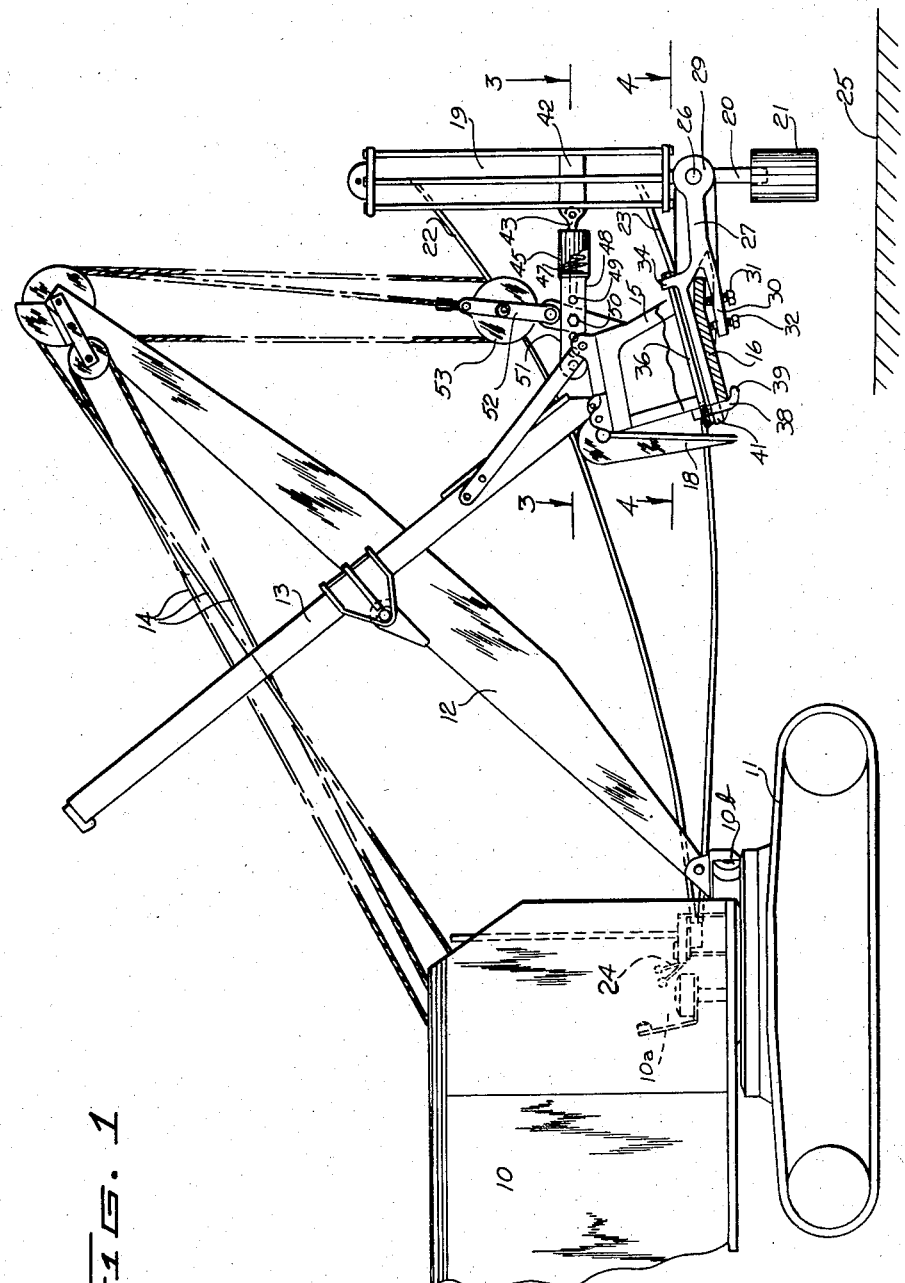
Figure 1 is a horizontal view of a power shovel rig having attached thereto an impact tool, parts of the bucket of the shovel being shown in section.

The power shovel rig may be of any suitable construction, and the construction thereof forms no part of the present invention except as hereinafter noted. Such shovels usually have a cab 10 for the operator, in which the operator stands or sits at an operator's position 10a to manipulate the bucket and shovel controls, which may be of the usual variety. The operator is, by these controls, enabled to control the movement of the tracks or wheels 11 to move the shovel or rig bodily, and also controls the positions of the supporting boom 12 and the shovel stick 13, these latter controls being affected in the usual manner by the cables 14. The boom 12 and all parts carried thereby are usually revolvable by the operator about the vertical axis of the turntable 10b of the rig.

Supported on the shovel stick 13 is a bucket, generally denoted by the numeral 15, which has an open front and a bottom portion 16 which usually has the forwardly extending teeth 17. The bucket has the usual dump door 18, which is operated to dump the bucket in any suitable manner—usually by a cable extending to the operator's cab.

All of the parts heretofore described, constitute an ordinary power shovel such as in common use, and their construction may vary within wide limits.

In the figures, the numeral 19 generally denotes a suitable impact tool comprising a cylinder having a piston therein, from which depends a piston rod 20 to the bottom of which may be secured a suitable striking tool 21. It will be understood that a large variety of striking tools may be employed, depending on the nature of the work to be done.

The piston rod 20 is reciprocated by admitting compressed air via the flexible pipes 22, 23, which are connected to cylinder ports above and below the piston and which extend inwardly to a point within reach of the shovel operator, where they are connected to a suitable valve mechanism, the handle of which is indicated at 24 in Figure 1, and the complete impact tool and a valve mechanism therefor are more fully discussed in the co-pending application, Serial No. 705,446, filed October 24, 1946, entitled Pavement Breaking Machine.

Air for operating the tool 19 may be obtained from any suitable source such as a compressor (not shown) mounted in the cab 10 of the shovel.

It will be observed that so far as the present invention is concerned, any suitable impact tool control mechanism and power supply may be employed. The air compressor may be separate from the shovel, or some other means such as electrical means can be employed to reciprocate the tool 19.

It will also be understood that the valve lever 24, when moved upward by the operator will raise the piston and rod 20 connected thereto, and when depressed, will cause the piston and rod 20 to move downward, bringing the tool 21 into contact with the surface 25 to be broken or tamped.

The attachment of the impact tool 19 to the bucket 15 is accomplished by providing the tool with a cross member or trunnion 26, which is mounted in means such as a clamp 27 having the ears 28, 29 to receive the outwardly extending axially aligned ends of the trunnion.

The clamp 27 has a portion 30 which extends underneath the bottom 16 of the bucket and is provided with adjusting screws 31, 32.

The clamp 27 has the upwardly extending ears 33, 34, adapted to receive a pair of bolts 35, 36, the threaded ends of which either engage or pass through the clamp members 37, 38, each of which has a nose as shown at 39 in Figure 1, which extends under the bottom of the bucket, and these bolts are equipped with suitable locking nuts 40, 41, so that when the parts are brought into assembled relation as best shown in Figures 1 and 4, by tightening the nuts 40, 41, and adjusting the screws 31, 32, the impact tool 19 is securely held to the bucket in a normal vertical position as in Figure 1, the tool being free to swing about the horizontal axis of the trunnion member 26.

In order that the impact tool or hammer 19 may assume various positions inclined to the vertical as shown in Figure 2, a band 42 is secured to the tool 19 in any suitable manner, and has an outwardly extending arm 43, provided with an enlarged flange portion 44 located within a housing 45, having springs 46, 47 therein which hold the flange portion in the center of the housing as best seen in Figure 3.

The housing 45 has outwardly extending arms 48 which are apertured as indicated at 49 to receive a cross bolt 50 which holds an arm 51 between arms 48 so it is free to turn about the bolt, said arm 51 being connected to the bucket 15 and to the bucket-lifting mechanism of the shovel such as the yoke 52, pulley 53 and some of the cables 14 associated therewith.

When the impact tool 19 is in the position shown in Figure 1, it will be obvious that by adjusting the arm 48 (by moving the bolt 50 into any one of the holes 49) that the inclination of the vertical axis of the tool may be varied.

Referring to Figure 2, it will be seen that by manipulating the shovel in the ordinary manner, that the tool may be moved to the various positions shown in dotted lines. For example, the tool may be moved to break a boulder 54, or it may be moved until it is completely horizontal in order to knock down a wall 55, and it may be quickly and easily moved to any intermediate position between that shown in solid lines in Figure 2, to that shown in the extreme upper position in dotted lines and that because of the manner in which the tool is attached to the bucket, it is at all times held rigid in respect to the work 25, 54, 55, but that the springs 46, 47 have an equalizing effect and prevent the tool from binding during movement.

It will be observed that the fittings necessary to attach the impact tool to the bucket are comparatively simple and inexpensive, and are easily and quickly attached and provide for all necessary adjustments.

It will also be observed that the impact tool 19 could easily be mounted on a member attached to the shovel stick 13 and also connected to the arm 51 and cables 14, via pulley 53 so as to be operative by the shovel rig without the bucket frame, the place of the latter being taken by a support of any desired form to suitably support the tool as above described. As the construction of such a support to replace the bucket 15 is obvious, it is not described herein.

Heretofore, impact tools as herein described, have been mounted on a complete chassis with wheels and were generally of the type shown in the co-pending application before mentioned, and the U. S. Patents #1,830,751 dated November 10, 1922, and #1,891,221 dated December 30, 1922, referred to therein, and the entire rig could only be used for breaking pavement and the like. However, by the instant invention, it is possible to take an ordinary shovel rig and convert it to a pavement breaker machine by the addition of the impact tool as herein described. Thus, the user has, in effect, two power rigs at his disposal; one, the ordinary power shovel rig, and the other an impact tool or pavement breaker, and it requires but little time to convert the shovel to the breaker and vice versa, which not only saves the large initial investment when two separate rigs are necessary, but also saves in transportation and space. It will be noted that the conversion of one rig to the other requires no expert fitting or careful adjustments, the work being of such a nature that it can be readily performed by common labor in the field.

What is claimed is:

1. In combination with a power shovel rig having a bucket with an open front, a clamp secured to the bucket and having jaws embracing the forwardly extending edge of the bottom thereof, an impact tool secured to said clamp in which said tool is free to turn about a horizontal axis, and means connected to said tool and extending between said tool and bucket for positioning said tool relative to said bucket, said means including a yieldable spring connection between the tool and the bucket.

2. In combination with a power shovel rig having a bucket with an open front, said bucket having a bottom with forwardly extending teeth, a clamp secured to said bucket and having portions overlying said teeth, said clamp having a portion extending toward the rear of said bucket on the underside thereof, an impact tool secured to said clamp in which said tool is free to turn about a horizontal axis, and means connected to said tool and to a portion of said rig for positioning said tool relative to said bucket, whereby when the bucket is moved by said rig, said tool will turn about said horizontal axis and assume various inclinations from the vertical depending upon the position of said bucket.

WALTER V. CORNETT.

REFERENCES CITED

The following references are of record in the file of this patent:

UNITED STATES PATENTS

| Number | Name | Date |
| --- | --- | --- |
| 1,731,985 | Reaney | Oct. 15, 1929 |
| 1,840,002 | Wallis | Jan. 5, 1932 |
| 1,870,288 | Hayward | Aug. 9, 1932 |
| 1,891,221 | Cornett | Dec. 20, 1932 |
| 2,237,839 | Miller | Apr. 8, 1941 |